United States Patent
Jeong et al.

(10) Patent No.: US 10,184,707 B2
(45) Date of Patent: Jan. 22, 2019

(54) HEAT PUMP AND METHOD OF CONTROLLING HEAT BASED ON OPERATING FREQUENCY OF HEATING LOAD OF HEATING SPACE THEREOF

(71) Applicant: SAMSUNG ELECTRONICS CO., LTD., Suwon (KR)

(72) Inventors: Dong Woon Jeong, Yongin (KR); Sung Goo Kim, Hwaseong (KR); Chang Seo Park, Yongin (KR); Jae Hyuk Oh, Seongnam (KR); Yong Hyun Jeon, Osan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 899 days.

(21) Appl. No.: 14/063,372

(22) Filed: Oct. 25, 2013

(65) Prior Publication Data
US 2014/0116074 A1 May 1, 2014

(30) Foreign Application Priority Data
Oct. 25, 2012 (KR) ........................ 10-2012-0119337

(51) Int. Cl.
F24D 11/02 (2006.01)
F24D 19/00 (2006.01)
(Continued)

(52) U.S. Cl.
CPC ........ F25B 49/025 (2013.01); F24D 11/0214 (2013.01); F24D 19/1039 (2013.01);
(Continued)

(58) Field of Classification Search
CPC ............. F24D 19/1039; F24D 11/0214; F25B 2600/02; F25B 2600/025; F25B 2600/0253; F25B 2700/171
(Continued)

(56) References Cited

U.S. PATENT DOCUMENTS 4,142,379 A * 3/1979 Kuklinski ............... F24D 17/02
62/179
4,307,576 A * 12/1981 Takano ..................... F25B 5/02
165/207
(Continued)

FOREIGN PATENT DOCUMENTS

CN 102326028 A 1/2012
CN 202254484 U 5/2012
(Continued)

OTHER PUBLICATIONS

Chinese Office Action dated Jan. 20, 2017 in corresponding Chinese Patent Application No. 201310513357.5.
(Continued)

*Primary Examiner* — Ned Landrum
*Assistant Examiner* — Daniel C Comings
(74) *Attorney, Agent, or Firm* — Staas & Halsey LLP

(57) ABSTRACT

A heat pump and a control method thereof, the control method of the heat pump which heats a heated space through heat exchange between outdoor air and a refrigerant and heat exchange between the refrigerant and circulation water, includes calculating the maximum allowable frequency of a compressor based on the temperature of the outdoor air and the heating load of the heated space, calculating the mean operating frequency of the compressor while the compressor is operated at the calculated maximum allowable frequency, recalculating the maximum allowable frequency based on a result of comparison between the mean operating frequency and the maximum allowable frequency, and operating the compressor at the recalculated maximum allowable frequency, thereby improving coefficient of performance (COP) of the heat pump.

16 Claims, 14 Drawing Sheets

(51) Int. Cl.
*F25B 49/02* (2006.01)
*F24D 19/10* (2006.01)

(52) U.S. Cl.
CPC ..... *F25B 2339/047* (2013.01); *F25B 2500/19* (2013.01); *F25B 2600/02* (2013.01); *F25B 2600/021* (2013.01); *F25B 2600/025* (2013.01); *F25B 2600/0253* (2013.01); *F25B 2700/171* (2013.01); *F25B 2700/2104* (2013.01); *F25B 2700/2106* (2013.01); *Y02B 30/125* (2018.05); *Y02B 30/741* (2013.01)

(58) Field of Classification Search
USPC ........... 62/175, 335, 215, 226, 228.1, 228.4, 62/238.1, 238.7
See application file for complete search history.

(56) References Cited

U.S. PATENT DOCUMENTS

| 4,351,160 | A | * | 9/1982 | Kountz | F04C 28/08 |
| | | | | | 62/201 |
| 6,370,896 | B1 | * | 4/2002 | Sakakibara | F25B 5/02 |
| | | | | | 62/152 |
| 2002/0014085 | A1 | | 2/2002 | Sakakibara et al. | |
| 2008/0134701 | A1 | * | 6/2008 | Christensen | F25B 31/002 |
| | | | | | 62/193 |
| 2011/0302947 | A1 | | 12/2011 | Honda | |
| 2011/0302948 | A1 | * | 12/2011 | Honda | F24D 3/08 |
| | | | | | 62/324.6 |
| 2013/0025301 | A1 | * | 1/2013 | Maitani | F24D 11/0214 |
| | | | | | 62/79 |

FOREIGN PATENT DOCUMENTS

| JP | 2004-144329 | | 5/2004 | | |
| JP | WO 2011129248 | A1 * | 10/2011 | .......... | F24D 11/0214 |

OTHER PUBLICATIONS

Chinese Decision on Grant dated Jun. 22, 2017 in corresponding Chinese Patent Application No. 20130513357.5.

* cited by examiner

HEAT PUMP AND METHOD OF CONTROLLING HEAT BASED ON OPERATING FREQUENCY OF HEATING LOAD OF HEATING SPACE THEREOF

CROSS-REFERENCE TO RELATED APPLICATIONS

This application claims the priority benefit of Korean Patent Application No. 10-2012-0119337, filed on Oct. 25, 2012 in the Korean Intellectual Property Office, the disclosure of which is incorporated herein by reference.

BACKGROUND

1. Field

The following description relates to a heat pump improving seasonal coefficient of performance (SCOP) and a control method thereof.

2. Description of the Related Art

Recently, research into on a heat pump type boiler having higher coefficient of performance (COP) than a conventional fuel burning type boiler is underway.

A heat pump type boiler uses outdoor thermal energy to heat an indoor space, and has excellent energy efficiency, as compared to the conventional fuel burning type boiler or electric heater. If the heating load of a heated space deviates from the heating performance range of a heat pump of the heat pump type boiler, COP of the heat pump is rapidly lowered due to characteristics of the heat pump providing heating by circulating a refrigerant through a compressor.

Moreover, even if the heating load of the heated space is within the heating performance range of the heat pump, COP of the heat pump is lowered by repetition of the on/off operation of the compressor of the heat pump. That is, in case of heating through the heat pump, after outdoor thermal energy is absorbed by the refrigerant and is then supplied to circulation water, the circulation water supplies thermal energy to the heated space, and thus the temperature of the heated space is slowly varied according to change of the frequency of the compressor of the heat pump. Therefore, the heat pump operates the compressor at the maximum operating frequency, and thereby, thermal energy larger than the heating load of the heated space is supplied and the on/off operation of the compressor is repeated.

Such on/off operation of the compressor lowers the COP of the heat pump, and particularly lowers seasonal coefficient of performance (SCOP) representing the mean COP of the heat pump for a required period.

SUMMARY

Therefore, it is an aspect of the present disclosure to provide a heat pump which improves coefficient of performance (COP) by operating a compressor of the heat pump at a proper operating frequency according to the heating load of a heated space, and a control method thereof.

Additional aspects of the disclosure will be set forth in part in the description which follows and, in part, will be apparent from the description, or may be learned by practice of the disclosure.

In accordance with one aspect of the present disclosure, a control method of a heat pump which heats a heated space through heat exchange between outdoor air and a refrigerant and heat exchange between the refrigerant and circulation water, includes calculating a maximum allowable frequency of a compressor based on a temperature of the outdoor air and a heating load of the heated space, calculating a mean operating frequency of the compressor while the compressor is operating at the calculated maximum allowable frequency, recalculating the maximum allowable frequency based on a result of comparison between the mean operating frequency and the maximum allowable frequency, and operating the compressor at the recalculated maximum allowable frequency.

The control method may further include recalculating the heating load of the heated space based on the recalculated maximum allowable frequency.

The recalculation of the maximum allowable frequency may include adding the calculated maximum allowable frequency and a predetermined frequency when the mean operating frequency is smaller than a product of the calculated maximum allowable frequency and an error coefficient.

The recalculation of the maximum allowable frequency may include subtracting a predetermined frequency from the calculated maximum allowable frequency when the mean operating frequency is equal to or greater than the calculated maximum allowable frequency.

The mean operating frequency may be calculated by dividing an integrated value of the operating frequency of the compressor during an operation of the compressor by an operating time of the compressor.

The compressor may increase the operating frequency when the temperature of the heated space is lower than a desired temperature input by a user.

In accordance with another aspect of the present disclosure, a heat pump which heats a heated space through heat exchange between outdoor air and a refrigerant and heat exchange between the refrigerant and circulation water, includes an outdoor unit including a compressor which circulates the refrigerant and an outdoor heat exchanger which evaporates the refrigerant to exchange heat between the refrigerant and the outdoor air, a hydro unit including an indoor heat exchanger which condenses the refrigerant to exchange heat between the refrigerant and the circulation water and a circulation pump which pumps the circulation water to the heated space, an outdoor temperature sensing unit which senses the temperature of the outdoor air, and a control unit which calculates the mean operating frequency of the compressor by operating the compressor at the maximum allowable frequency calculated based on a sensing result of the outdoor temperature sensing unit and the heating load of the heated space, recalculates the maximum allowable frequency based on a result of comparison between the mean operating frequency and the maximum allowable frequency, and operates the compressor at the recalculated maximum allowable frequency.

The control unit may recalculate the heating load of the heated space based on the recalculated maximum allowable frequency.

The control unit may recalculate the maximum allowable frequency by adding the calculated maximum allowable frequency and a predetermined frequency when the mean operating frequency is smaller than a product of the calculated maximum allowable frequency and an error coefficient.

The control unit may recalculate the maximum allowable frequency by subtracting a predetermined frequency from the calculated maximum allowable frequency when the mean operating frequency is equal to or greater than the calculated maximum allowable frequency.

The control unit may calculate the mean operating frequency by dividing an integrated value of the operating frequency of the compressor during an operation of the compressor by an operating time of the compressor.

The hydro unit may further include a sub-heater which heats the circulation water having heat-exchanged with the refrigerant.

The heat pump may further include a heating unit which heats the heated space through the circulation water.

The heating unit may include a heating valve which opens and closes a flow of the circulation water, an input unit which receives a desired temperature input by a user, an indoor temperature sensing unit which senses the temperature of the heated space, and the heating unit may control opening and closing of the heating valve according to a result of comparison between the desired temperature and a sensing result of the indoor temperature sensing unit.

The control unit may increase the operating frequency of the compressor if the temperature of the heated space is lower than the desired temperature input by the user.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
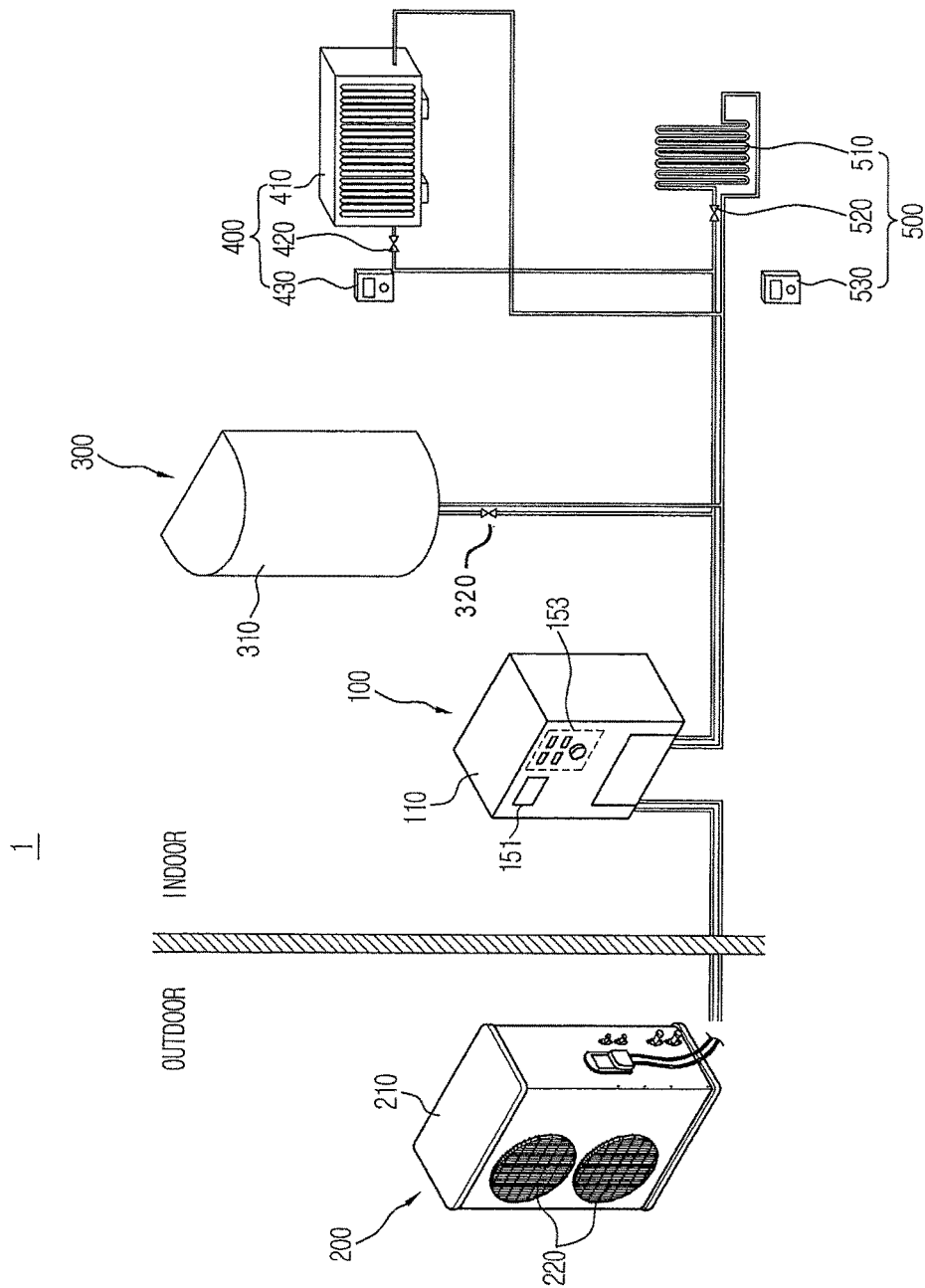
FIG. 1 is a view illustrating a heat pump in accordance with an embodiment of the present disclosure.

Reference will now be made in detail to embodiments of the present disclosure, examples of which are illustrated in the accompanying drawings, wherein like reference numerals refer to like components throughout.

FIG. 1 is a view illustrating a heat pump 1 in accordance with one embodiment of the present disclosure.

With reference to FIG. 1, the heat pump 1 in accordance with an embodiment of the present disclosure includes a hydro unit 100, an outdoor unit 200, a hot water tank 300, a first heating unit 400 and a second heating unit 500.

The hydro unit 100 includes a main body 110 to form the external appearance of the hydro unit 100, a main input unit 151 provided at one side portion of the main body 110 and to receive control instructions input by a user and used to supply power to the heat pump 1 and execute the operation mode of the heat pump 1, and a main display unit 153 provided at one side portion of the main body 110 and displaying operation information, such as the operation mode of the heat pump 1, etc.

Here, the main input unit 151 may include, for example, a button-type switch, a membrane switch or a touch panel, and the main display unit 153 may include, for example, a liquid crystal display (LCD) panel or a light emitting diode (LED) panel. However, the main input unit 151 and the main display unit 153 are not limited thereto.

Although the hydro unit 100 of the heat pump 1 in accordance with an embodiment of the present disclosure includes the main input unit 151 and the main display unit 153 separately provided, embodiments of the present disclosure are not limited thereto and the hydro unit 100 may include a touchscreen panel (TSP) which receives control instructions input by a user and displays the operation information of the heat pump 1.

The hydro unit 100 is provided indoors, and performs heat exchange between a refrigerant and circulation water. Specifically, the hydro unit 100 heats the circulation water through latent heat of the refrigerant.

The outdoor unit 200 is provided outdoors, and includes a main body 210 which forms the external appearance of the outdoor unit 200 and outlets 220 provided at one side portion of the main body 210 and discharges air having heat-exchanged in the outdoor unit 200.

The hot water tank 300 includes a water reservoir 310 which forms the external appearance of the hot water tank 300 and stores the circulation water heated by the hydro unit 100, and a hot water tank valve 320 which opens and closes flow of the circulation water supplied to the water reservoir 310.

The first heating unit 400 is provided in a first heated space, and includes a radiator 410, a first heating valve 420 and a first temperature regulator 430. The radiator 410 radiates heat of the circulation water to the first heated space to heat the first heated space, and the first heating valve 420 opens and closes flow of the circulation water supplied to the radiator 410. Further, the first temperature regulator 430 controls opening and closing of the first heating valve 420 by comparing the temperature of the first heated space with a desired temperature input by a user.

The second heating unit 500 is provided in a second heated space, and includes an underfloor heater 510, a second heating valve 520 and a second temperature regulator 530. The underfloor heater 510 provides heat of the circulation water to the floor of the second heated space to heat the second heated space, and the second heating valve 520 opens and closes flow of the circulation water supplied to the underfloor heater 510. Further, the second temperature regulator 530 controls opening and closing of the second heating valve 520 by comparing the temperature of the second heated space with a desired temperature input by a user.

Although the heat pump 1 in accordance with an embodiment of the present disclosure includes the first heating unit 400 including one radiator 410 and the second heating unit 500 including one underfloor heater 510, embodiments of the present disclosure are not limited thereto. For example, at least one heating unit may include at least one radiator or at least one underfloor heater, or include both at least one radiator and at least one underfloor heater.

Figure 2:
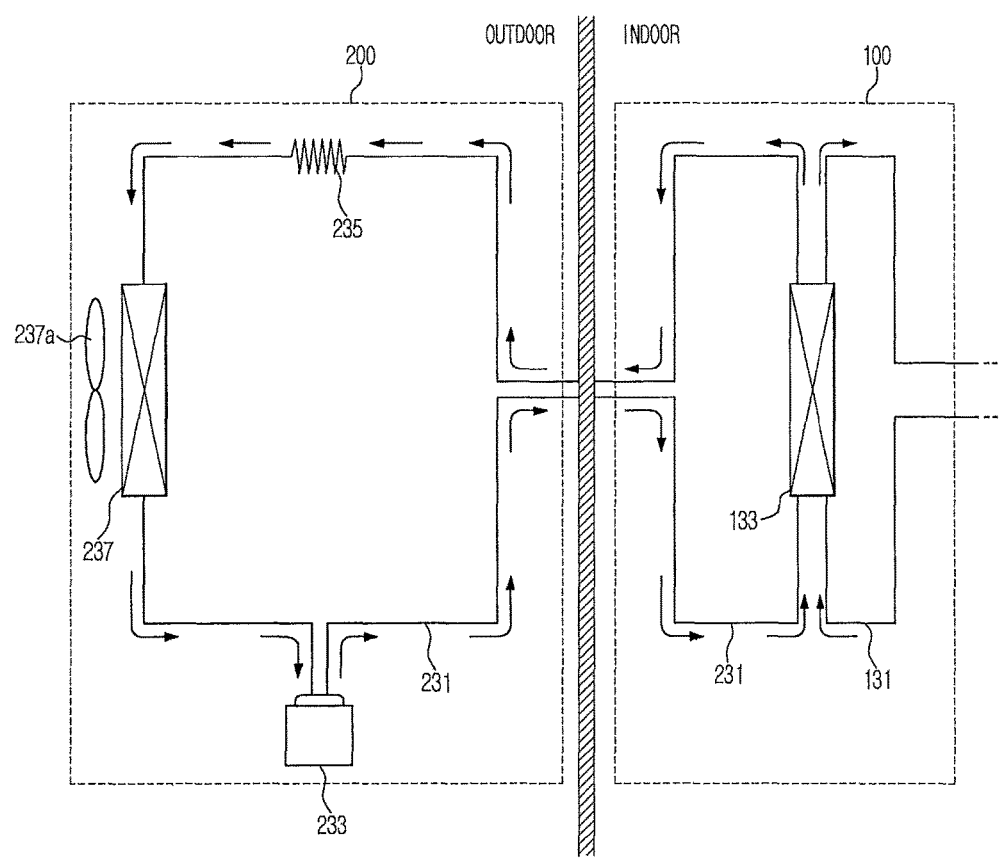
FIG. 2 is a view illustrating circulation of a refrigerant of the heat pump in accordance with an embodiment of the present disclosure.

FIG. 2 is a view illustrating circulation of the refrigerant of the heat pump 1 in accordance with an embodiment of the present disclosure. The arrows in FIG. 2 represent a circulation direction of the refrigerant.

With reference to FIG. 2, the refrigerant of the heat pump 1 in accordance with an embodiment of the present disclosure circulates through a compressor 233, an indoor heat exchanger 133, an expansion valve 235, and an outdoor heat exchanger 237 along a refrigerant channel 231.

The compressor 233 is installed in the outdoor unit 200, compresses the refrigerant in a low-pressure vapor phase to a pressure at which the refrigerant may be condensed using rotating force of a compressor driving motor (not shown) rotated by electrical energy supplied from an external power source, and pumps the compressed refrigerant in the high-pressure vapor phase to the indoor heat exchanger 133. The refrigerant may circulate through the indoor heat exchanger 133, the expansion valve 235 and the outdoor heat exchanger 237 along the refrigerant channel 231 by pressure generated by the compressor 233.

The refrigerant in the high-pressure vapor phase compressed by the compressor 233 moves to the indoor heat exchanger 133 along the refrigerant channel 231.

The indoor heat exchanger 133 is installed in the hydro unit 100. Since the refrigerant channel 231 and a circulation water channel 13 cross each other in the indoor heat exchanger 133, the indoor heat exchanger 133 executes heat exchange between the refrigerant and the circulation water.

Specifically, the indoor heat exchanger 133 condenses the refrigerant in the high-pressure vapor phase, and heats the circulation water through latent heat discharged from the refrigerant during the condensing process of the refrigerant in the high-pressure vapor phase. In more detail, when the refrigerant is changed from a vapor phase to a liquid phase, the refrigerant discharges thermal energy as much as a difference between internal energy of the refrigerant in the vapor phase and internal energy of the refrigerant in the liquid phase, and the indoor heat exchanger 133 provides the heat discharged from the refrigerant to the circulation water to heat the circulation water.

As the indoor heat exchanger 133 may include, for example, a spiral heat exchanger (SHE) in which two spiral channels are formed and the refrigerant and the circulation water pass through the respective channels so as to achieve heat exchange therebetween, or a plate heat exchanger (PHE) in which plural heat transfer plates are stacked and the refrigerant and the circulation water alternately flow between the heat transfer plates so as to achieve heat exchange therebetween.

The refrigerant in the high-pressure liquid phase condensed by the indoor heat exchanger 133 moves to the expansion valve 235 along the refrigerant channel 231.

The expansion valve 235 is installed in the outdoor unit 200 and decompresses the refrigerant in the high-pressure liquid phase. Specifically, the expansion valve 235 decompress the refrigerant in the high-pressure liquid phase to a pressure at which the refrigerant may be evaporated through throttling in which, when a fluid passes through a narrow path, such as a nozzle or an orifice, the pressure of the fluid is lowered even without heat exchange with the outside.

The refrigerant in the low-pressure liquid phase decompressed by the expansion valve 235 moves to the outdoor heat exchanger 237 along the refrigerant channel 231.

The outdoor heat exchanger 237 is installed in the outdoor unit 200, and evaporates the refrigerant in the low-pressure liquid phase. Specifically, as the refrigerant in the outdoor heat exchanger 237 is changed from the liquid phase to the vapor phase, the refrigerant absorbs thermal energy from the outside as much as a difference between internal energy of the refrigerant in the liquid phase and internal energy of the refrigerant in the vapor phase.

Since the outdoor heat exchanger 237 is cooled during an evaporating process of the refrigerant in the low-pressure liquid phase, as described above, an outdoor fan 237a forcibly blowing air around the outdoor heat exchanger 237 to assist heat exchange is installed in the outdoor unit 200.

The refrigerant in the low-pressure vapor phase evaporated by the outdoor heat exchanger 237 moves to the compressor 233 along the refrigerant channel 231.

As described above, while the refrigerant circulates through the compressor 233, the indoor heat exchanger 133, the expansion valve 235 and the outdoor heat exchanger 237 along the refrigerant channel 231, the refrigerant absorbs thermal energy from outdoor air in the outdoor heat exchanger 237, and provides thermal energy to the circulation water in the indoor heat exchanger 133.

Figure 3:
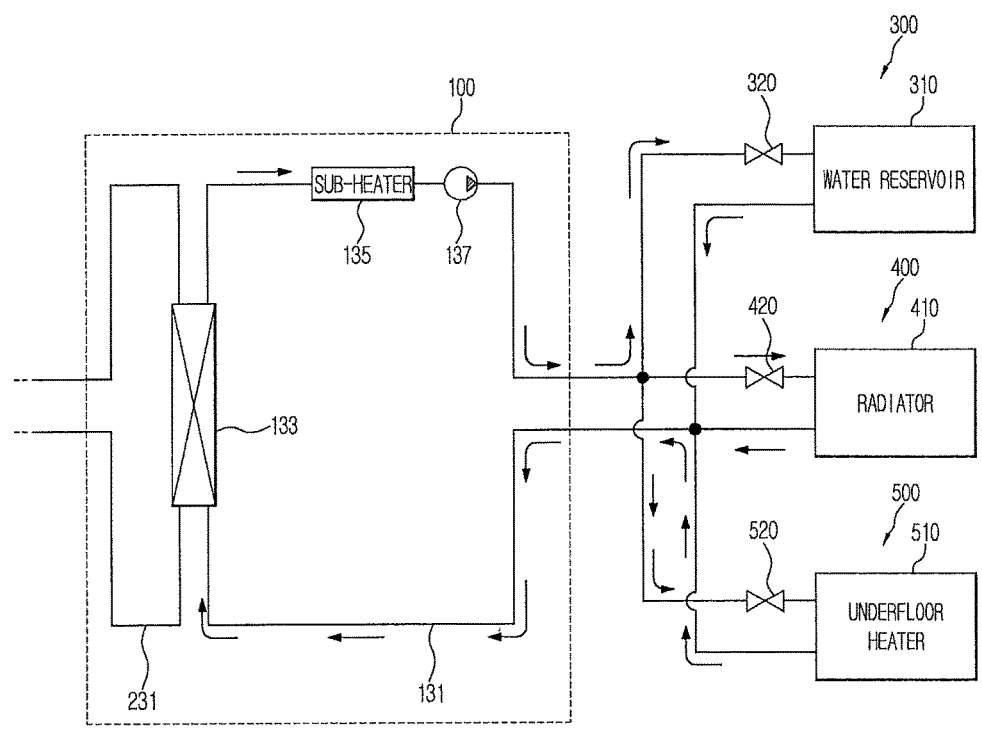
FIG. 3 is a view illustrating circulation of circulation water of the heat pump in accordance with an embodiment of the present disclosure.

FIG. 3 is a view illustrating circulation of the circulation water of the heat pump 1 in accordance with an embodiment of the present disclosure.

With reference to FIG. 3, the circulation water of the heat pump 1 in accordance with an embodiment of the present disclosure circulates through the indoor heat exchanger 133, a sub-heater 135, a circulation water pump 137, the hot water tank 300, the first heating unit 400 and the second heating unit 500 along the circulation water channel 131.

The indoor heat exchanger 133 is installed in the hydro unit 100, as described above, and heats the circulation water using latent heat generated when the refrigerant in the vapor phase is condensed. The indoor heat exchanger 133 has been described above in the description of circulation of the refrigerant, and a detailed description thereof will thus be omitted.

The circulation water heated by the indoor heat exchanger 133 is provided to the sub-heater 135 along the circulation water channel 131.

The sub-heater 135 is installed in the hydro unit 100, and includes a heating wire (not shown) which receives electric energy from the outside and emits Joule's heat. If thermal energy supplied from the indoor heat exchanger 133 to the circulation water is insufficient due to excessively low outdoor air temperature, the sub-heater 135 may provide additional thermal energy to the circulation water.

The circulation water heated by the indoor heat exchanger 133 and the sub-heater 135 moves to the circulation water pump 137 along the circulation water channel 131.

The circulation water pump 137 is installed in the hydro unit 100, and pumps the circulation water to at least one of the hot water tank 300, the first heating unit 400 and the second heating unit 500 which will be described later, using rotating force of a circulation water pump driving motor (not shown) rotated by electrical energy supplied from the external power source.

The hot water tank 300 includes the water reservoir 310 and the hot water tank valve 320, the first heating unit 400 includes the radiator 410, the first heating valve 420 and the first temperature regulator 430 (See FIG. 1), and the second heating unit 500 includes the underfloor heater 510, the second heating valve 520 and the second temperature regulator 530 (See FIG. 1). The respective components of the hot water tank 300, the first heating unit 400 and the second heating unit 500 have been described above in the description of the configuration of the heat pump 1, and a detailed description thereof will thus be omitted.

The circulation water cooled by the hot water tank 300, the first heating unit 400 or the second heating unit 500 is provided to the indoor heat exchanger 133 along the circulation water channel 131, and is heated again. That is, the circulation water receives thermal energy from the indoor heat exchanger 133 and the sub-heater 135, and transmits the thermal energy to hot water of the hot water tank 300, the first heated space and the second heated space.

Figure 4:
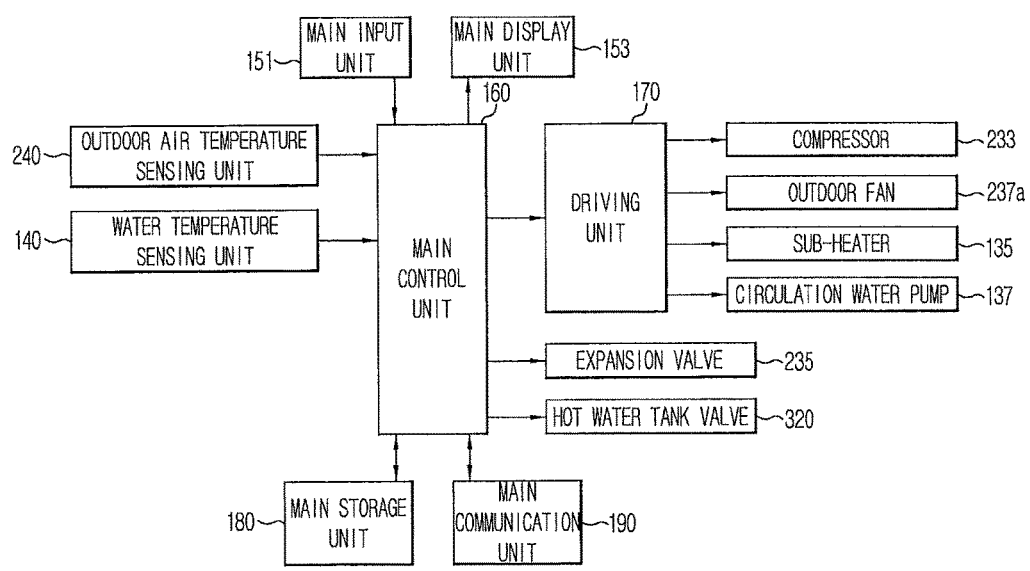
FIG. 4 is a block diagram illustrating overall control flow of the heat pump in accordance with an embodiment of the present disclosure.

FIG. 4 is a block diagram illustrating overall control flow of the heat pump 1 in accordance with an embodiment of the present disclosure.

As shown in FIG. 4, the heat pump 1, in order to perform the function thereof, includes the main input unit 151, the main display unit 153, an outdoor air temperature sensing unit 240, a water temperature sensing unit 140, a main storage unit 180, a main communication unit 190, a main control unit 160, a driving unit 170, the compressor 233, the outdoor fan 237a, the sub-heater 135, the circulation water pump 137, the expansion valve 235, and the hot water tank valve 320.

The main input unit 151, the main display unit 153, the compressor 233, the outdoor fan 237a, the sub-heater 135, the circulation water pump 137, the expansion valve 235 and the hot water tank valve 320 have been described above, and a detailed description thereof will thus be omitted.

The outdoor air temperature sensing unit 240 is provided in the outdoor unit 200, measures the outdoor temperature and provides the measured outdoor temperature to the main control unit 160. Such an outdoor air temperature sensing unit 240 may include, for example, a thermistor, the electric resistance of which is varied according to temperature.

The water temperature sensing unit 170 is provided in the hot water tank 300, measures the temperature of the circulation water stored in the hot water tank 300 and provides the measured temperature of the circulation water to the main control unit 160. The water temperature sensing unit 140 may also include, for example, a thermistor.

The main storage unit 180 stores a program which controls the operation of the heat pump 1 and data, and provides various data to the main control unit 160 upon request of the main control unit 160. For example, the main storage unit 180 may store the maximum operating frequencies, the minimum operating frequencies and the maximum allowable frequencies of the compressor 233, heating performances of the heat pump 1 according to the operating frequencies of the compressor 223 and outdoor temperatures, and the heating loads of a heated space according to outdoor temperatures.

The main communication unit 190 receives control instructions from a user through the first heating unit 400 or the second heating unit 500, and transmits operation information of the heat pump 1 to the first heating unit 400 and the second heating unit 500.

The main control unit 160 controls the overall operation of the heat pump 1.

The main control unit 160 controls the driving unit 170 to operate the compressor 233, the sub-heater 135 and the circulation water pump 137, controls opening and closing of the expansion valve 235 and the hot water tank valve 320, and displays the operation information of the heat pump 1 on the main display unit 153, based on control instructions input by a user through the main input unit 151, control instructions received from a user through the main communication unit 190, and sensing results of the outdoor air temperature sensing unit 240 and the water temperature sensing unit 140.

Specifically, when water heating instructions are input by a user through the main input unit 151, the main control unit 160 controls the driving unit 170 to operate the compressor 233 so that external thermal energy absorbed by the refrigerant is transmitted to the circulation water, and to operate the circulation water pump 135, and opens the hot water tank valve 320 to store the circulation water in the hot water tank 300.

Further, when operating instructions are received from a user through the main communication unit 190, the main control unit 160 controls the driving unit 170 to operate the compressor 233 so that external thermal energy absorbed by the refrigerant is transmitted to the circulation water, and to operate the circulation water pump 135 so that thermal energy is provided to the first heated space or the second heated space through the circulation water.

Figure 5:
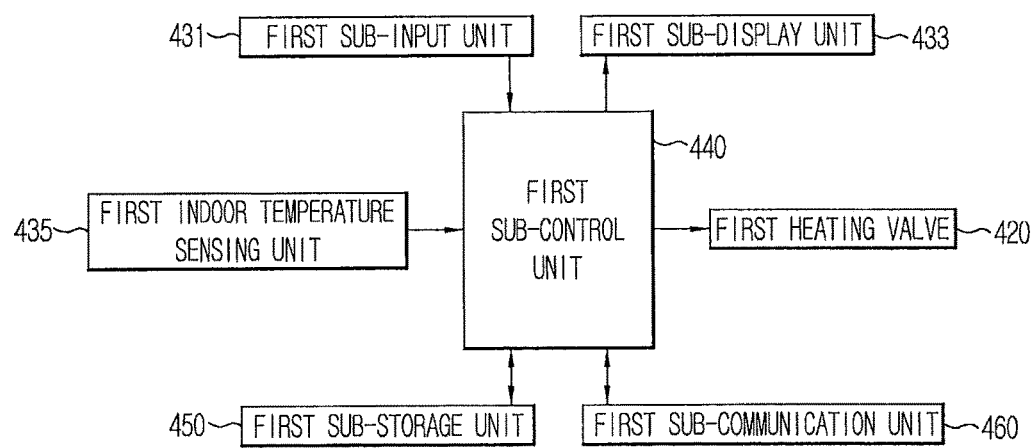
FIG. 5 is a block diagram illustrating control flow of a first heating unit of the heat pump in accordance with an embodiment of the present disclosure.
Figure 6:
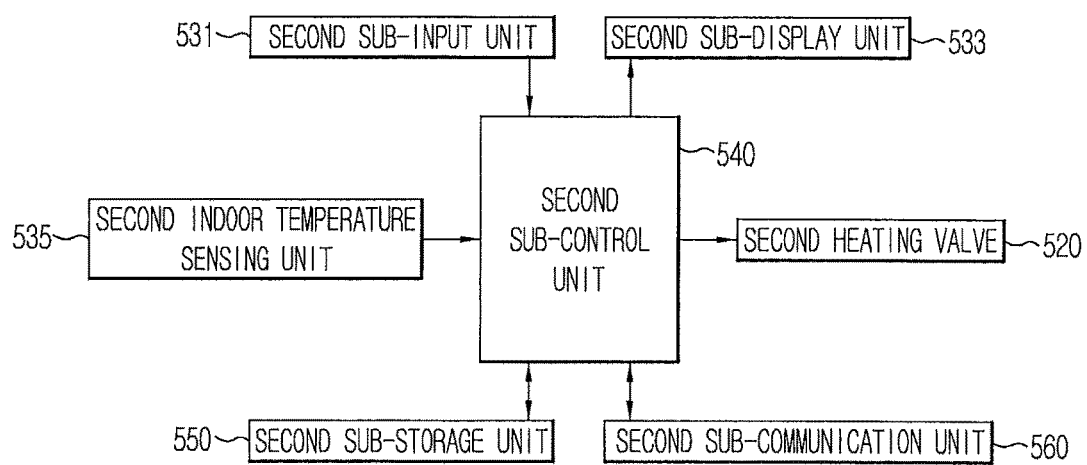
FIG. 6 is a block diagram illustrating control flow of a second heating unit of the heat pump in accordance with an embodiment of the present disclosure.

FIG. 5 is a block diagram illustrating control flow of the first heating unit 400 of the heat pump 1 in accordance with an embodiment of the present disclosure, and FIG. 6 is a block diagram illustrating control flow of the second heating unit 500 of the heat pump 1 in accordance with an embodiment of the present disclosure.

With reference to FIG. 5, in order to heat the first heated space, the first heating unit 400 includes a first sub-input unit 431, a first sub-display unit 433, a first indoor temperature sensing unit 435, a first sub-storage unit 450, a first sub-communication unit 460, a first sub-control unit 440 and a first heating valve 420.

The first heating valve 420 has been described above in the description of the configuration of the heat pump 1, and a detailed description thereof will thus be omitted.

The first sub-input unit 431 is provided at one side portion of the first temperature regulator 430, and receives whether or not the first heating unit 400 is operated and a user desired temperature of the first heated space. Such a first sub-input unit 431 may include a button-type switch, a membrane switch and/or a dial-type switch. For example, whether or not the first heating unit 400 is operated may be input through, for example, a button-type or a membrane switch, and the user desired temperature of the first heated space may be input through, for example, a dial-type switch.

The first sub-display unit 433 is provided at one side portion of the first temperature regulator 430 and displays the operation information of the first heating unit 400 and the temperature of the first heated space. Such a first sub-display unit 433 may include, for example, a liquid crystal display (LCD) panel or a light emitting diode (LED) panel.

The first indoor temperature sensing unit 435 is provided at one side portion of the first temperature regulator 430, measures the temperature of the first heated space and provides a result of measurement to the first sub-control unit 440. The first indoor temperature sensing unit 435 may include, for example, a thermistor, the electric resistance of which is varied according to temperature.

The first sub-storage unit 450 stores a program which controls the operation of the first heating unit 400 and data, such as the user desired temperature of the first heated space, and provides various data to the first sub-control unit 440 upon request of the first sub-control unit 440.

The first sub-communication unit 460 transmits control instructions input by a user through the first sub-input unit 431 to the main control unit 160 through the main communication unit 190, and receives the operation information of the heat pump 1 from the main control unit 160.

The first sub-control unit 440 controls the overall operation of the first heating unit 400.

The first sub-control unit 440 controls opening and closing of the first heating valve 420 based on control instructions input by a user through the first sub-input unit 431 and the sensing result of the first indoor temperature sensing unit 435, transmits the control instructions input by the user to the main control unit 160 through the first sub-communication unit 460, and controls the first sub-display unit 433 to display the temperature of the first heated space and the operation information of the heat pump 1.

Specifically, when operation instructions are input by a user through the first sub-input unit 431, the first sub-control unit 440 transmits the operation instructions input by the user to the main control unit 160 through the first sub-communication unit 460, opens the first heating valve 420 to supply heated circulation water to the radiator 410, and controls the first sub-display unit 433 to display that heating is provided to the first heated space.

With reference to FIG. 6, in order to heat the second heated space, the second heating unit 500 includes a second sub-input unit 531, a second sub-display unit 533, a second indoor temperature sensing unit 535, a second sub-storage unit 550, a second sub-communication unit 560, a second sub-control unit 540 and a second heating valve 520.

The second heating valve 520 has been described above in the description of the configuration of the heat pump 1, and a detailed description thereof will thus be omitted.

The second sub-input unit 531 is provided at one side portion of the second temperature regulator 530, and receives whether or not the second heating unit 500 is operated and a user desired temperature of the second heated space. The configuration of such a second sub-input unit 531 is the same as the configuration of the first sub-input unit 431 described in the first heating unit 400, and a detailed description thereof will thus be omitted.

The second sub-display unit 533 is provided at one side portion of the second temperature regulator 530 and displays the operation information of the second heating unit 500 and the temperature of the second heated space. The configuration of such a second sub-display unit 533 is the same as the configuration of the first sub-display unit 433 described in the first heating unit 400, and a detailed description thereof will thus be omitted.

The second indoor temperature sensing unit 535 is provided at one side portion of the second temperature regulator 530, measures the temperature of the second heated space and provides a result of measurement to the second sub-control unit 540. The configuration of such a second indoor temperature sensing unit 535 is the same as the configuration of the first indoor temperature sensing unit 435 described in the first heating unit 400, and a detailed description thereof will thus be omitted.

The second sub-storage unit 550 stores a program which controls the operation of the second heating unit 500 and data, such as the user desired temperature of the second heated space, and provides various data to the second sub-control unit 540 upon request of the second sub-control unit 540.

The second sub-communication unit 560 transmits control instructions input by a user through the second sub-input unit 531 to the main control unit 160 through the main communication unit 190, and receives the operation information of the heat pump 1 from the main control unit 160.

The second sub-control unit 540 controls the overall operation of the second heating unit 500.

The second sub-control unit 540 controls opening and closing of the second heating valve 520 based on control instructions input by a user through the second sub-input unit 531 and the sensing result of the second indoor temperature sensing unit 535, transmits the control instructions input by the user to the main control unit 160 through the second sub-communication unit 560, and controls the second sub-display unit 533 to display the temperature of the second heated space and the operation information of the heat pump 1.

The configuration of the heat pump 1 in accordance with an embodiment of the present disclosure has been described above. Hereinafter, the operation of the heat pump 1 in accordance with an embodiment of the present disclosure will be described.

The heat pump 1 in accordance with an embodiment of the present disclosure operates the compressor 233 and the circulation water pump 137 according to operation instructions input by a user through the first heating unit 400 or the second heating unit 500, thus heating the first heated space or the second heated space.

For example, if a desired temperature input by a user through the first sub-input unit 431 provided in the first heating unit 400 is higher than the temperature of the first heated space sensed by the first indoor temperature sensing unit 435, the first heating unit 400 transmits the fact that the user inputs the operation instructions through the first sub-communication unit 460 to the main control unit 160, and opens the first heating valve 420. The main control unit 160 having received the operation instructions input by the user from the first heating unit 400 operates the compressor 233 to execute heat exchange between the refrigerant and the circulation water in the indoor heat exchanger 133 provided in the hydro unit 100, and operates the circulation pump 137 to provide the circulation water heated by the indoor heat exchanger 133 to the first heating unit 400. The heat pump 1 heats the first heated space by providing the heated circulation water to the first heating unit 400.

If the heat pump 1 operates at least one of the compressor 233 to heat the first heated space and the second heated space, as described above, the heat pump 1 may vary heating performance by varying the operating frequency of the compressor 233.

In general, the rated operating frequency of a compressor at which compression efficiency of the compressor becomes the maximum is set. That is, when the compressor is operated at a higher frequency than the rated operating frequency or is operated at a lower frequency than the rated operating frequency, the compression efficiency of the compressor is decreased. Further, the maximum operating frequency and the minimum operating frequency of the compressor at which the compression efficiency reaches a predetermined set value or more are set, and the compressor is operated between the maximum operating frequency and the minimum operating frequency. Here, the maximum operating frequency of the compressor may be set in consideration of coefficient of performance (COP) and heating performance of a heat pump in which the compressor is installed as well as the compression efficiency of the compressor. Specifically, in order to improve the COP, the maximum operating frequency of the compressor may be varied according to outdoor temperature.

Figure 7:
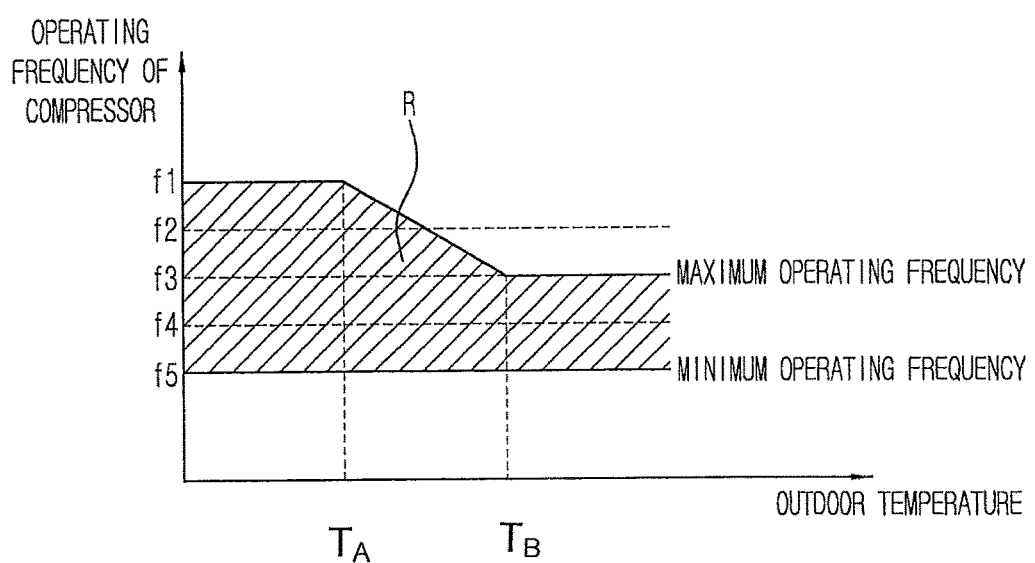
FIG. 7 is a view illustrating an operating frequency of a compressor of the heat pump in accordance with an embodiment of the present disclosure.

FIG. 7 is a view illustrating operating frequency of the compressor 233 of the heat pump 1 in accordance with an embodiment of the present disclosure. Operating frequencies f1, f2, f3, f4 and f5 of the compressor 233 may vary as the outdoor temperature increases. For example, as the outdoor temperature increases between $T_A$ and $T_B$, the maximum operating frequency decreases from f1 to f3 while the minimum operating frequency f5 does not change. A region R defines the operating frequency range between the maximum operating frequency and the minimum operating frequency of the compressor 233.

As shown in FIG. 7, in the heat pump 1 in accordance with an embodiment of the present disclosure, if outdoor temperature is high, in order to maximize the COP of the heat pump 1, the maximum operating frequency of the compressor 233 is set to be equal to the rated operating frequency f3, and if outdoor temperature is low, in order to improve the heating performance of the heat pump 1, the maximum operating frequency of the compressor 233 is set to be higher than the rated operating frequency f3. Like this, the heating capacity of the heat pump 1 is varied according to the operating frequency of the compressor 233.

Figure 8:
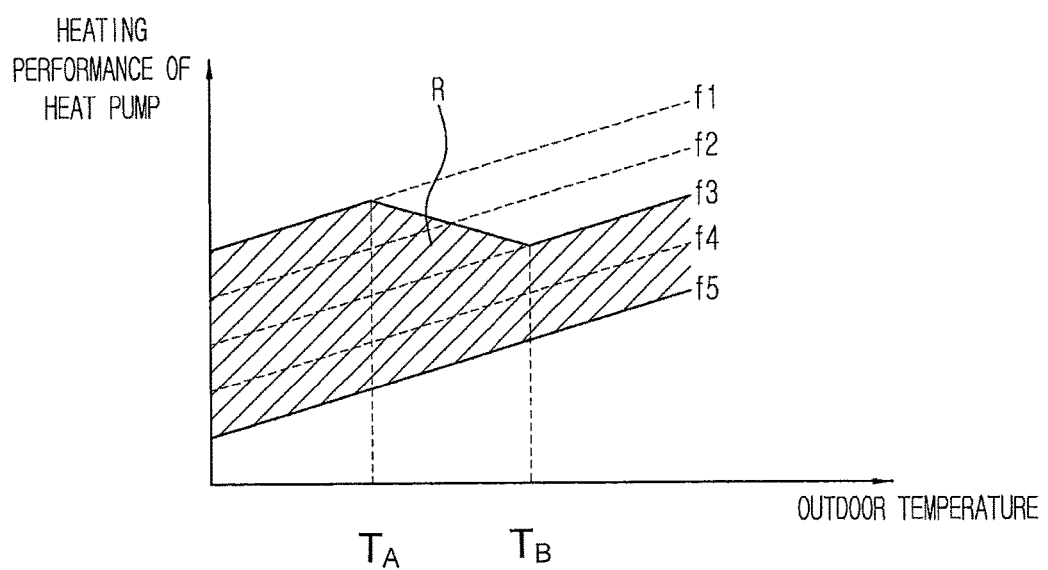
FIG. 8 is a view illustrating heating performance of the heat pump in accordance with an embodiment of the present disclosure.

FIG. 8 is a view illustrating heating performance of the heat pump 1 in accordance with an embodiment of the present disclosure.

With reference to FIG. 8, when outdoor temperature is fixed, the heating performance of the heat pump 1 is raised as the operating frequency of the compressor 233 increases, and when the operating frequency of the compressor 233 is fixed, the heating performance of the heat pump 1 is raised as outdoor temperature increases. The heat pump 1 executes heating by absorbing outdoor thermal energy through the refrigerant in the outdoor heat exchanger 233 and providing the thermal energy to the circulation water in the indoor heat exchanger 133, and thus the heating performance of the heat pump 1 is raised as outdoor temperature increases.

The region R corresponds to heating performance which the heat pump 1 performs only through the heat exchangers without operation of the sub-heater 135.

Figure 9:
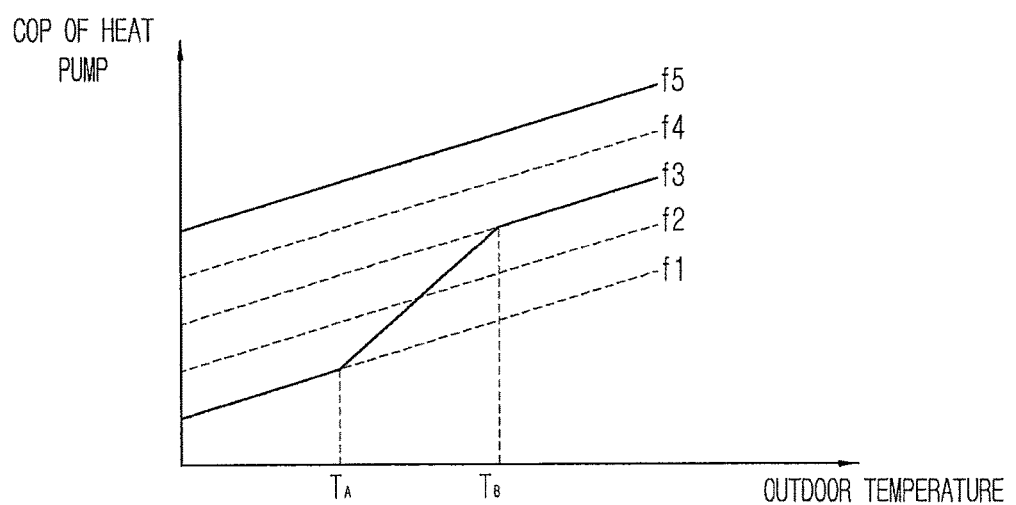
FIG. 9 is a view illustrating coefficient of performance (COP) of the heat pump in accordance with an embodiment of the present disclosure.

FIG. 9 is a view illustrating coefficient of performance (COP) of the heat pump 1 in accordance with an embodiment of the present disclosure.

With reference to FIG. 9, when outdoor temperature is fixed, the COP of the heat pump 1 is raised as the operating frequency of the compressor 233 decreases, and when the operating frequency of the compressor 233 is fixed, the COP of the heat pump 1 is raised as outdoor temperature increases.

When the compressor 233 is operated at a high frequency, higher thermal energy than thermal energy required by a heated space is supplied to the heated space. Thereby, the temperature of the heated space is excessively raised, and thus the heat pump 1 stops operation of the compressor 233. Thereafter, when the temperature of the heated space is lowered, the heat pump 1 operates the compressor 233 again. Since the heat pump 1 repeats operation and stoppage of the compressor 233, the COP of the heat pump 1 is lowered. On the other hand, when the compressor 233 is operated at a low frequency, the heat pump 1 continuously operates compressor 233 in order to supply thermal energy required by the heated space, and thus the COP of the heat pump 1 may be improved.

With reference to FIGS. 8 and 9, the heating performance of the heat pump 1 tends to be raised as the operating frequency of the compressor 233 increases, and the COP of the heat pump 1 tends to be lowered as the operating frequency of the compressor increases.

Therefore, the heat pump 1 in accordance with the embodiment of the present disclosure is operated in a heating performance preferred mode and a COP preferred mode according to the heating performance and the COP of the heat pump 1.

In case of the heating performance preferred mode, the heat pump 1 may operate the compressor 233 at the maximum operating frequency and thus exhibit the maximum heating performance.

The heat pump 1 executes proportional integral differential (PID) control in which a difference between a desired temperature input by a user and the temperature of the heated space is used as an input value, with respect to the operating frequency of the compressor 233. That is, the heat pump 1 raises the operating frequency of the compressor 233 until the temperature of the heated space reaches the desired temperature input by the user. Since variation of the temperature of the heated space according to variation of the operating frequency of the compressor 233 is considerable slowly carried out, the operating frequency of the compressor 233 is continuously raised and, when the operating frequency of the compressor 233 reaches the maximum operating frequency, the operating frequency is not raised any further. Further, since variation of the temperature of the heated space according to variation of the operating frequency of the compressor 233 is considerable slowly carried out, as described above, the compressor 233 is generally operated at the maximum operating frequency.

When the compressor 233 is operated at the maximum operating frequency, operation and stoppage of the compressor 233 are repeated and thus the COP of the heat pump 1 may be lowered.

In the COP preferred mode, the heat pump 1 operates the compressor 233 at a proper operating frequency according to heating performance (hereinafter, referred to as "heating load") required by the heated space, and thus maximizes the COP while sufficiently heating the heated space. When the heat pump 1 operates the compressor 233 at the minimum operating frequency in order to maximize the COP, the COP is improved but proper heating is not provided to the heated space. Therefore, the heat pump 1 calculates the heating load of the heated space, and sets the operating frequency of the compressor 233 to exhibit heating performance corresponding to the heating load.

The heat pump 1 calculates the heating load of the heated space to calculate the proper operating frequency of the compressor 233, and sets the operating frequency of the compressor 233 corresponding to the calculated heating load as the maximum allowable frequency of the compressor 233. The maximum allowable frequency means the operating frequency of the compressor 233 to exhibit heating performance corresponding to the heating load calculated by the heat pump 1, and if the heat pump 1 is operated in the COP preferred mode, the compressor 233 is not operated at more than the set maximum allowable frequency.

A designer of the heat pump 1 does not know the heating load of a heated space in which the heat pump 1 will be used, and thus sets the initial heating load according to outdoor temperature based on the mean heating load of heated spaces in which the heat pump 1 is used. Further, the maximum allowable frequency is set according to the initial heating load set by the designer of the heat pump 1.

Figure 10:
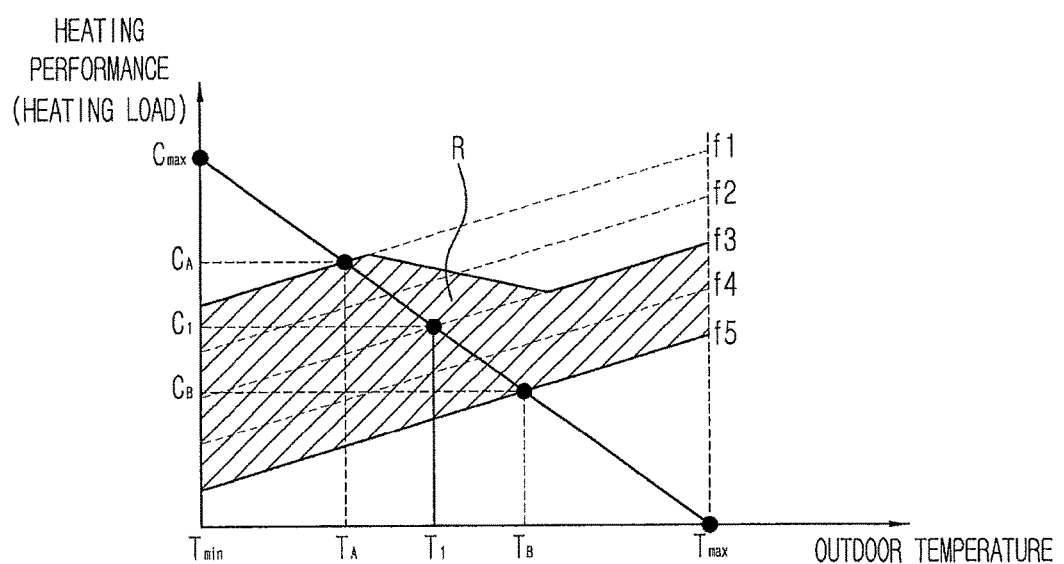
FIG. 10 is a view illustrating an initial heating load if the heat pump in accordance with an embodiment of the present disclosure is operated in a COP preferred mode.

FIG. 10 is a view illustrating the heating load if the heat pump 1 in accordance with an embodiment of the present disclosure is operated in the COP preferred mode.

Specifically, FIG. 10 illustrates the heating load and the heating performance of the heat pump 1 according to an outdoor temperature which is present between a maximum outdoor temperature $T_{max}$ at which the heated space does not require heating and the minimum outdoor temperature $T_{min}$ at which the heat pump 1 may be normally operated.

With reference to FIG. 10, If the outdoor temperature is $T_{max}$, the heated space does not require heating and the heating load corresponds to '0', and if the outdoor temperature is $T_{min}$, the initial heating load corresponds to the maximum heating performance $C_{max}$ which the heat pump 1 may exhibit. Further, as outdoor temperature decreases, the heating performance which the heated space requires, i.e., the heating load, is gradually increased.

Between outdoor temperatures $T_A$ and $T_B$ at which the region R and the initial heating loads cross each other, the heat pump 1 may sufficiently heat the heated space by operating only the compressor 233 without operation of the sub-heater 135. Particularly, if outdoor temperature is $T_B$, the heat pump 1 may sufficiently heat the heated space only by operating the compressor 233 at the minimum operating frequency f5, and if outdoor temperature is $T_A$, the heat pump 1 may heat the heated space by operating the compressor 233 at the maximum operating frequency f1.

Therefore, between outdoor temperatures $T_A$ and $T_B$, sufficient heating may be provided to the heated space by operating the compressor 233 at an operating frequency to exhibit the same heating performance as the heating load of the heated space. For example, when outdoor temperature is $T_1$, heating load is $C_1$ and sufficient heating may be provided to the heated space by operating the compressor 233 at the operating frequency f3.

Therefore, when the outdoor temperature is between $T_A$ and $T_B$, the maximum allowable frequency of the compressor 233 becomes the operating frequency at which the heat pump 1 exhibits the same heating performance as the heading load of the heated space at the corresponding temperature.

At an outdoor temperature higher than the outdoor temperature $T_B$ at which the minimum heating performance of the heat pump 1 by the heat exchangers is greater than the heating load, the heat pump 1 operates the compressor 233 at the minimum operating frequency and the on/off operation of the compressor 233 is repeated to provide heat to the heated space. Further, at an outdoor temperature lower than the outdoor temperature $T_A$ at which the maximum heating performance of the heat pump 1 by the heat exchangers is smaller than the heating load, the heat pump 1 operates the sub-heater 135, while continuously operating the compressor 233 at the maximum operating frequency, to provide heat to the heated space.

Therefore, if an outdoor temperature is lower than $T_A$, the maximum allowable frequency of the compressor 233 is equal to the maximum operating frequency f1, and if an outdoor temperature is higher than $T_B$, the maximum allowable frequency of the compressor 233 is equal to the minimum operating frequency f5.

In summary, if an outdoor temperature is lower than $T_A$, the maximum allowable frequency of the compressor 233 is equal to the maximum operating frequency, if an outdoor temperature is between $T_A$ and $T_B$, the maximum allowable frequency of the compressor 233 is equal to the operating frequency of the compressor 233 to exhibit the same heating performance as the heating load of the heated space, and if an outdoor temperature is higher than $T_B$, the maximum allowable frequency of the compressor 233 is equal to the minimum operating frequency.

Figure 11:
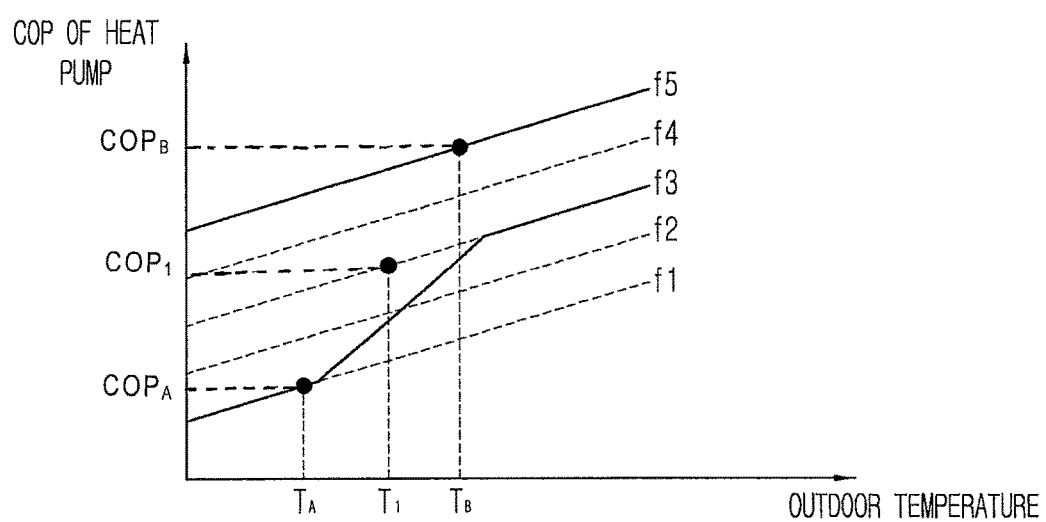
FIG. 11 is a view illustrating COP of the heat pump in accordance with an embodiment of the present disclosure if the heat pump is operated in the COP preferred mode.

FIG. 11 is a view illustrating COP if the heat pump in accordance with an embodiment of the present disclosure is operated in the COP preferred mode.

As shown in FIG. 11 if the heat pump 1 is operated in the COP preferred mode, when an outdoor temperature is $T_A$, the COP becomes $COP_A$, when the outdoor temperature is $T_1$, the COP becomes $COP_1$, and when the outdoor temperature is $T_B$, the COP becomes $COP_B$.

Figure 12:
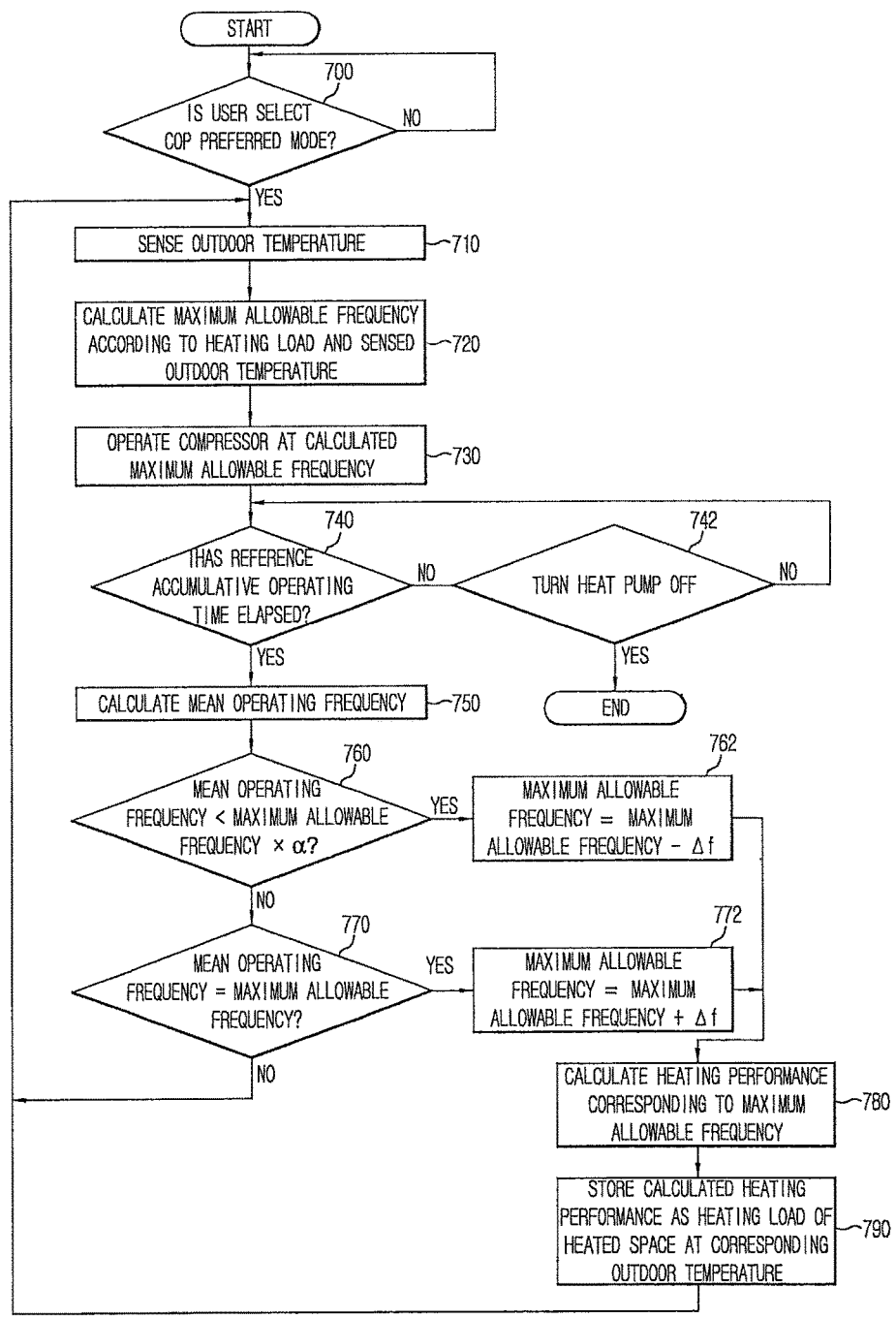
FIG. 12 is a flowchart illustrating a control method of a heat pump in accordance with one embodiment of the present disclosure if the heat pump is operated in the COP preferred mode.

FIG. 12 is a flowchart illustrating a control method of the heat pump 1 in accordance with one embodiment of the present disclosure if the heat pump 1 is operated in the COP preferred mode.

With reference to FIG. 12, the heat pump 1 determines whether or not a user selects the COP preferred mode through the main input unit 151 provided in the hydro unit 100 (Operation 700).

Thereafter, the heat pump 1 senses an outdoor temperature through the outdoor air temperature sensing unit 240 (Operation 710), and calculates the maximum allowable frequency based on a heating load and the sensed outdoor temperature (Operation 720). Specifically, the heat pump 1 may calculate the heating load and the maximum allowable frequency using heating loads according to outdoor temperatures stored in the main storage unit 180 and the operating frequencies of the compressor 233 according to the heating performances of the heat pump 1.

Thereafter, the heat pump 1 heats a heated space by operating the compressor 233 (Operation 730). Here, the compressor 233 is not operated at an operating frequency higher than the maximum allowable frequency calculated in Operation 720.

Thereafter, the heat pump 1 determines whether or not a reference accumulative operating time after operation of the heat pump 1 has elapsed (Operation 740). Specifically, the heat pump 1 determines whether or not the reference accumulative operating time after operation of the heat pump 1 under the condition that the maximum allowable frequency is the operating frequency calculated in Operation 720.

Upon determining that the reference accumulative operating time has not elapsed, the heat pump 1 determines whether or not operation of the heat pump 1 is terminated (Operation 742). Specifically, when operation terminating instructions are input by a user or the temperature of the heated space is higher than a desired temperature input by the user, the heat pump 1 terminates operation. If operation of the heat pump 1 is maintained, whether or not the reference accumulative operating time has elapsed is determined again.

Upon determining that the reference accumulative operating time has elapsed, the heat pump 1 calculates the mean operating frequency of the compressor 233 for the reference accumulative operating time (Operation 750). The mean operating frequency of the compressor 233 may be acquired by integrating the product of the actual operating frequency and the unit time for the reference accumulative operating time and then dividing the resultant value by the accumulative operating time.

Thereafter, the heat pump 1 compares the product of the maximum allowable frequency calculated in Operation 720 and an error coefficient a with the mean operating frequency (Operation 760). The error coefficient α is a real number which is greater than 0 and less than 1, and as the error coefficient α is closer to 1, an error between the mean operating frequency and the maximum allowable frequency is decreased. For example, the error coefficient α may be 0.9.

When the product of the maximum allowable frequency and the error coefficient α is greater than the mean operating frequency, the heat pump 1 decreases the maximum allowable frequency of the compressor 233 by a predetermined frequency Δf (Operation 762). The fact that the product of the maximum allowable frequency calculated in Operation 720 and the error coefficient α is greater than the mean operating frequency means that, if the compressor 233 is operated at the maximum allowable frequency calculated in Operation 720, the compressor 233 repeats the on/off operation. That is, it means that the heating performance of the heat pump 1 is greater than the heating load of the heated space. Therefore, the heat pump 1 may reduce heating performance and improve COP by lowering the maximum allowable frequency of the compressor 233.

Thereafter, the heat pump 1 calculates the heating performance of the heat pump 1 corresponding to the maximum allowable frequency calculated in Operation 762 (Operation 780).

Thereafter, the heat pump 1 stores the heating performance calculated in Operation 780 as the heating load at the outdoor temperature sensed in Operation 710 (Operation 790).

When the product of the maximum allowable frequency calculated in Operation 720 and the error coefficient α is equal to or smaller than the mean operating frequency of the compressor 233, the heat pump 1 compares the mean operating frequency with the maximum allowable frequency (Operation 770). The fact that the product of the maximum allowable frequency calculated in Operation 720 and the error coefficient a is smaller than the mean operating frequency means that, if the compressor 233 is operated at the maximum allowable frequency calculated in Operation 720, the on/off operation of the compressor 233 is minimized and the heating performance provided by the heat pump 1 is similar to or smaller than the heating load of the heated space. Therefore, whether or not the heating performance provided by the heat pump 1 is smaller than the heating load of the heated space is determined, and in order to determine whether or not the heating performance provided by the heat pump 1 is smaller than the heating load of the heated space, the heat pump 1 compares the mean operation frequency with the maximum allowable frequency of the compressor 233.

When the mean operating frequency of the compressor 233 is greater than or equal to the maximum allowable frequency calculated in Operation 720, the heat pump 1 increases the maximum allowable frequency of the compressor 233 by a predetermined frequency Δf (Operation 772). Therefore, the fact that the mean operating frequency of the compressor 233 is greater than or equal to the maximum allowable frequency means that, if the compressor 233 is operated at the maximum allowable frequency calculated in Operation 720, the compressor 233 is continuously operated without the on/off operation. The fact that the compressor 233 is continuously operated at the maximum allowable frequency calculated in Operation 720 means that the heating performance of the heat pump 1 is smaller than the heating load of the heated space and thus the heat pump 1 is continuously operated. Therefore, the heat pump 1 improves COP by increasing the maximum allowable frequency of the compressor 233.

Thereafter, the heat pump 1 calculates the heating performance of the heat pump 1 corresponding to the maximum allowable frequency calculated in Operation 772 (Operation 780).

Thereafter, the heat pump 1 stores the heating performance calculated in Operation 780 as the heating load at the outdoor temperature sensed in Operation 710 (Operation 790).

When the mean operating frequency of the compressor 233 is smaller than the maximum allowable frequency calculated in Operation 720, the heat pump 1 senses the outdoor temperature again and repeats the above-described Operations. The fact that the mean operating frequency of the compressor 233 is greater than the product of the maximum allowable frequency calculated in Operation 720 and the error coefficient a and is smaller than the maximum allowable frequency means that, if the compressor 233 is operated at the maximum allowable frequency calculated in Operation 720, the heating performance of the heat pump 1 is similar to the heating load of the heated space, and it means that the heat pump 1 sufficiently heats the heated space and the COP of the heat pump 1 is maximized.

Figure 13:
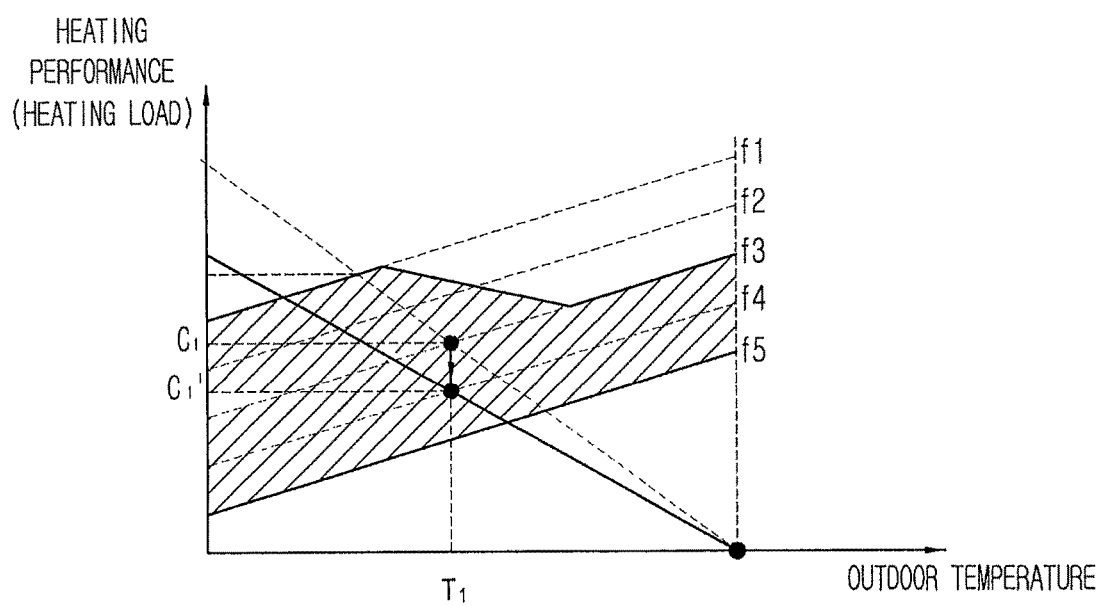
FIG. 13 is a view illustrating variation of heating performance of the heat pump in accordance with an embodiment of the present disclosure if the heat pump is operated in the COP preferred mode.
Figure 14:
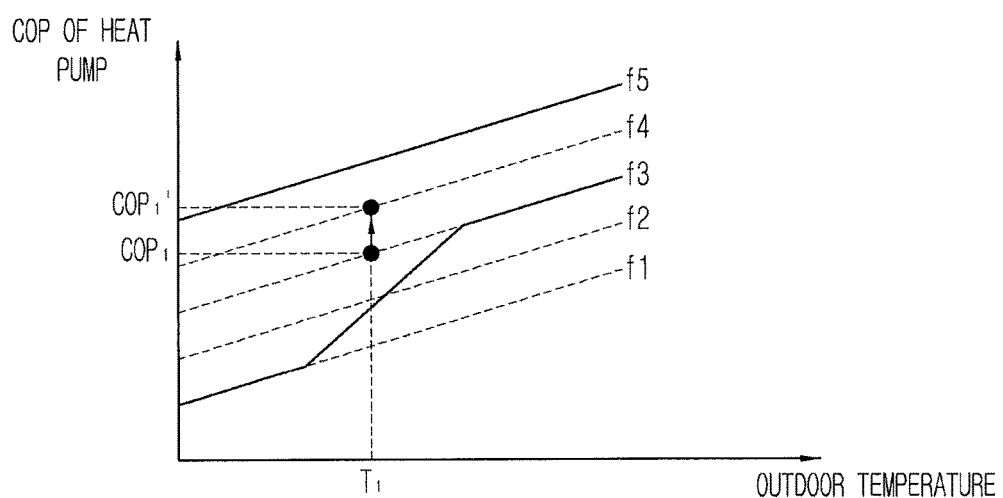
FIG. 14 is a view illustrating variation of COP of the heat pump in accordance with an embodiment of the present disclosure if the heat pump is operated in the COP preferred mode.

FIG. 13 is a view illustrating variation of heating performance of the heat pump 1 in accordance with an embodiment of the present disclosure if the heat pump 1 is operated in the COP preferred mode, and FIG. 14 is a view illustrating variation of COP of the heat pump 1 in accordance with an embodiment of the present disclosure if the heat pump 1 is operated in the COP preferred mode. In FIG. 13, initial heating loads set by a designer of the heat pump 1 are expressed by dots, and actual heating loads of a heated space in which the heat pump 1 is installed are expressed by a solid line.

As shown in FIG. 13, based on the initial heating loads, if the outdoor temperature is $T_1$, the heating load of the heated space is $C_1$, and the operating frequency of the compressor 233 so as to cause the heat pump 1 to exhibit heating performance $C_1$ is f3. Therefore, the maximum allowable frequency of the compressor 233 becomes f3. That is, the compressor 233 is not operated at an operating frequency higher than f3.

However, if the outdoor temperature is $T_1$, an actual heating load $C_1'$, and if the heating performance of the heat pump 1 is $C_1'$, the operating frequency of the compressor 233 is f4. Therefore, when the heat pump 1 operates the compressor 233 at the maximum allowable frequency f3, the compressor 233 repeats turning-on/off, and the mean operating frequency of the compressor 233 becomes f4.

Since the mean operating frequency f4 of the compressor 233 is smaller than the maximum allowable frequency f3 of the compressor 233, the heat pump 1 decreases the maximum allowable frequency of the compressor 233 until the maximum allowable frequency of the compressor 233 becomes f4.

When the maximum allowable frequency of the compressor 233 becomes f4, the heating performance of the heat pump 1 becomes equal to the heating load of the heated space. That is, the heat pump 1 sufficiently heats the heated space, and the COP of the heat pump 1 is maximized.

With reference to FIG. 14, when the heat pump 1 operates the compressor 233 under the condition that the maximum allowable frequency of the compressor 233 is f3 based on the initial heating loads set by the designer, the COP of the heat pump 1 becomes $COP_1$. Hereinafter, as the heat pump 1 decreases the maximum allowable frequency of the compressor 233, the COP of the heat pump 1 is improved, and when the maximum allowable frequency of the compressor 233 becomes f4, the COP of the heat pump 1 becomes $COP_1'$. Consequently, the COP of the heat pump 1 is improved from $COP_1$ to $COP_1'$.

As is apparent from the above description, a heat pump in accordance with one embodiment of the present disclosure calculates the heating load of a heated space and changes the operating frequency of a compressor according to the calculated heating load, thus improving coefficient of performance (COP).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A control method of a heat pump which heats a heated space through heat exchange between outdoor air and a refrigerant and heat exchange between the refrigerant and circulation water, the control method comprising:
    calculating a maximum allowable frequency of a compressor based on a temperature of the outdoor air and a heating load of the heated space;
    operating the compressor at the calculated maximum allowable frequency,
    calculating a mean operating frequency of the compressor while operating the compressor at the calculated maximum allowable frequency;
    comparing a product of the calculated maximum allowable frequency and an error coefficient with the calculated mean operating frequency;
    recalculating the maximum allowable frequency based on a result of the comparison between the product of the calculated maximum allowable frequency and the error coefficient with the calculated mean operating frequency;
    operating the compressor at the recalculated maximum allowable frequency,
    recalculating the heating load of the heated space based on the recalculated maximum allowable frequency; and
    recalculating the maximum allowable frequency by increasing the maximum allowable frequency when the product of the calculated maximum allowable frequency and the error coefficient is greater than the calculated mean operating frequency, which indicates that a heating performance of the heat pump is greater than the heating load of the heated space, in order to prevent the compressor from repeating on and off operation.

2. The control method according to claim 1, wherein the mean operating frequency is calculated by dividing an integrated value of an operating frequency of the compressor during an operation of the compressor by an operating time of the compressor.

3. The control method according to claim 1, where the recalculating of the maximum allowable frequency includes decreasing the maximum allowable frequency when the product of the calculated maximum allowable frequency and the error coefficient is equal to or less than the mean operating frequency, which indicates that the heating performance of the heat pump is less than the heating load of the heated space, in order to prevent the compressor from being on operation all the time.

4. The control method according to claim 3, wherein the mean operating frequency is calculated by dividing an integrated value of an operating frequency of the compressor during an operation of the compressor by an operating time of the compressor.

5. The control method according to claim 1, wherein the compressor increases the operating frequency of the compressor when the temperature of the heated space is lower than a desired temperature input by a user.

6. A heat pump which heats a heated space through heat exchange between outdoor air and a refrigerant and heat exchange between the refrigerant and circulation water, the heat pump comprising:
    an outdoor unit including a compressor which circulates the refrigerant and an outdoor heat exchanger which evaporates the refrigerant to exchange heat between the refrigerant and the outdoor air;
    a hydro unit including an indoor heat exchanger which condenses the refrigerant to exchange heat between the refrigerant and the circulation water and a circulation pump which pumps the circulation water to the heated space;
    an outdoor temperature sensing unit which senses a temperature of the outdoor air; and
    a control unit which
        calculates a maximum allowable frequency of the compressor based on the sensed temperature and a heating load of the heated space,
        operates the compressor at the calculated maximum allowable frequency,
        calculates a mean operating frequency of the compressor while operating the compressor at the calculated maximum allowable frequency,
        compares a product of the calculated maximum allowable frequency and an error coefficient with the calculated mean operating frequency;
        recalculates the maximum allowable frequency based on a result of the comparison between the product of the calculated maximum allowable frequency and the error coefficient with the calculated mean operating frequency, and
        operates the compressor at the recalculated maximum allowable frequency,
        wherein the control unit recalculates the heating load of the heated space based on the recalculated maximum allowable frequency,
        wherein the control unit recalculates the maximum allowable frequency by increasing the maximum allowable frequency when the product of the calculated maximum allowable frequency and the error coefficient is greater than the calculated mean operating frequency, which indicates that a heating performance of the heat pump is greater than the heating load of the heated space, in order to prevent the compressor from repeating on and off operation.

7. The heat pump according to claim 6, wherein the control unit calculates the mean operating frequency by dividing an integrated value of an operating frequency of the compressor during an operation of the compressor by an operating time of the compressor.

8. The heat pump according to claim 6, wherein the control unit recalculates the maximum allowable frequency by decreasing the maximum allowable frequency when the product of the calculated maximum allowable frequency and the error coefficient is equal to or less than the mean operating frequency, which indicates that the heating performance of the heat pump is less than the heating load of the heated space, in order to prevent the compressor from being on operation all the time.

9. The heat pump according to claim 8, wherein the control unit calculates the mean operating frequency by dividing an integrated value of an operating frequency of the compressor during an operation of the compressor by an operating time of the compressor.

10. The heat pump according to claim 6, wherein the hydro unit further includes a sub-heater which heats the circulation water having heat-exchanged with the refrigerant.

11. The heat pump according to claim 10, further comprising a heating unit which heats the heated space through the circulation water.

12. The heat pump according to claim 11, wherein:
the heating unit includes a heating valve which opens or closes a flow of the circulation water, an input unit which receives a desired temperature input by a user, an indoor temperature sensing unit which senses the temperature of the heated space; and
the heating unit controls opening or closing of the heating valve according to a result of comparison between the desired temperature and the temperature of the heated space sensed by the indoor temperature sensing unit.

13. The heat pump according to claim 12, wherein the control unit increases the operating frequency of the compressor when the temperature of the heated space is lower than the desired temperature input by the user.

14. The heat pump according to claim 11, wherein the heating unit includes at least one of a radiator which radiates the heat of the circulation water to the heated space and an underfloor heater which provides the heat of the circulation water to a floor of the heated space.

15. The heat pump according to claim 6, wherein the indoor heat exchanger includes a spiral heat exchanger which includes a plurality of spiral channels formed therein and the refrigerant and the circulation water pass through the plurality of spiral channels so as to perform the heat exchange therebetween.

16. The heat pump according to claim 6, wherein the indoor heat exchanger includes a plate heat exchanger which includes a plurality of heat transfer plates stacked therein and the refrigerant and the circulation water alternately flow between the heat transfer plates to perform the heat exchange therebetween.

* * * * *